United States Patent [19]

Johnson

[11] Patent Number: 4,719,487

[45] Date of Patent: Jan. 12, 1988

[54] CAMERA HAVING TILTABLE PHOTOCELL LENS ASSEMBLY

[75] Inventor: Bruce K. Johnson, Andover, Mass.

[73] Assignee: Polaroid Corporation, Cambridge, Mass.

[21] Appl. No.: 920,733

[22] Filed: Oct. 20, 1986

[51] Int. Cl.⁴ ............................................. G03B 7/099
[52] U.S. Cl. ................................................. 354/481
[58] Field of Search ................. 354/476, 477, 478, 481

[56] References Cited

U.S. PATENT DOCUMENTS

| 3,023,684 | 3/1962 | Stimson. | |
|---|---|---|---|
| 3,221,624 | 12/1965 | Haupt et al. | 354/476 |
| 3,291,996 | 12/1966 | Stimson | 250/234 |
| 3,442,191 | 5/1969 | Harvey. | |
| 4,173,400 | 11/1979 | Faramarzpour | 354/27 |
| 4,185,903 | 1/1980 | Land | 354/59 |
| 4,345,828 | 8/1982 | Johnson | 354/27 |

Primary Examiner—Russell E. Adams, Jr.
Attorney, Agent, or Firm—Alfred E. Corrigan

[57] ABSTRACT

A photographic camera having an automatic exposure control circuit including a photocell lens assembly mounted for movement through an angle greater than ninety degrees, as the camera is rotated in either direction about its optical axis between a horizontally orientated picture taking attitude and a vertically orientated picture taking attitude, so as to compensate for variations in scene illumination received by the photocell lens assembly in the three attitudes, i.e., one horizontal and two vertical.

4 Claims, 7 Drawing Figures

CAMERA HAVING TILTABLE PHOTOCELL LENS ASSEMBLY

BACKGROUND OF THE INVENTION

1. Field of the Invention

This invention relates to a photographic camera having a tiltable photocell lens assembly for providing a compensated field of view when the camera is located in a predetermined orientation relative to a scene to be photographed.

2. Description of the Prior Art

The present invention relates to a photographic camera having a photocell unit for varying the exposure of a film unit in accordance with the intensity of scene light measured thereby, and more particularly to such a unit which will provide a correction in the field viewed by the photocell unit when the camera is rotated 90° to take advantage of dimensional differences in a rectangular film format vis-a-vis a square film format.

U.S. Pat. No. 3,442,191 discloses a camera having an optical system for confining the acceptance angle of a photosensitive element to an angle generally below the horizontal when the optical axis of the camera's lens is generally maintained along the horizontal, regardless of the angular orientation of the camera. In other words, the field of view and the acceptance angle remain substantially the same during rotation of the camera about its roll axis, i.e., about the camera's optical axis or one parallel therewith. In the '191 patent, the field of view of the optical system is determined by the shape of a meniscus of a liquid which partially fills a tube whose axis is parallel to the optical axis of the camera and which is located between the photosensitive surface of a photosensitive element and the scene.

In response to the rotation of the above-noted camera about its optical axis, the attitude of the meniscus and its shape remain unchanged because of the symmetry of the tube about its axis, thus stablizing the field of view in response to camera roll (rotation of the camera about its optical axis). In response to camera pitch (change in angle of elevation due to rotation of the camera about a pitch axis perpendicular to the optical axis of the camera), the stability of the field of view is dependent on the stability of the curvature of the meniscus since the meniscus acts as a lens located in front of the sensitive surface of the photocell. Unfortunately, it appears the shape of the meniscus changes as the elevation angle of the camera changes primarily because of the non-symmetry of the tube about the pitch axis. As a consequence, the field of view shifts with any significant changes in the elevation angle of the camera as measured from the horizontal since the field of view is perturbed to the extent that the shape of the meniscus changes.

U.S. Pat. No. 4,185,903 discloses a photocell assembly which includes a pendulously mounted ring which provides a roll sensitive control that maintains the field of view of a photocell lens in a fixed position as its associated camera is rotated about its optical (roll) axis. Such an assembly required a substantially friction-free connection between the ring and its supporting structure thus adding to the cost of its construction.

SUMMARY OF THE INVENTION

The present invention relates to a photographic camera of the type having a photoresponsive means for controlling an exposure control mechanism of the camera. The camera includes an exposure system including an objective lens having an optical axis and a shutter assembly connected to the photoresponsive means so as to control the exposure of a film unit. The photoresponsive means includes a photocell unit comprised of a light sensitive element and a photocell lens assembly for directing scene light onto a photosensitive surface of the light sensitive element. The light sensitive element may be a silicon photodiode arranged in a reversed biased manner to provide an output signal which has an electrical characteristic that varies in a given manner in accordance with the amount of radiant power incident upon its photosensitive surface. The camera also includes a lens board having a support for the photocell lens assembly.

The photocell lens assembly support is constructed to encompass the lens assembly without any fixed connection therebetween. The construction of the support is such that it substantially limits movement of the photocell lens assembly relative to the light sensitive element during movement of the camera about its pitch axis. However, the support does permit angular movement of the photocell lens assembly through an angle of approximately five degrees relative to the light sensitive element when the camera is rotated substantially ninety degrees about an axis parallel or coincidental with the camera's optical axis, from a substantially horizontally orientated picture taking attitude, i.e., one where a wall of the camera is in a substantially horizontal plane, to a substantially vertically orientated picture taking attitude, i.e., where the aforementioned wall is located in a substantially vertical plane. The photocell lens assembly includes a pair of laterally spaced support members for stabilizing the assembly against such relative angular rotation until the camera has been rotated about its roll axis through an angle of approximately forty-five degrees.

An object of the invention is to provide a camera with a photocell lens assembly which moves through an angle greater than ninety degrees as the camera is rotated about its roll axis through an angle of approximately ninety degrees, thus compensating for variations in scene illumination received by the photocell lens assembly.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
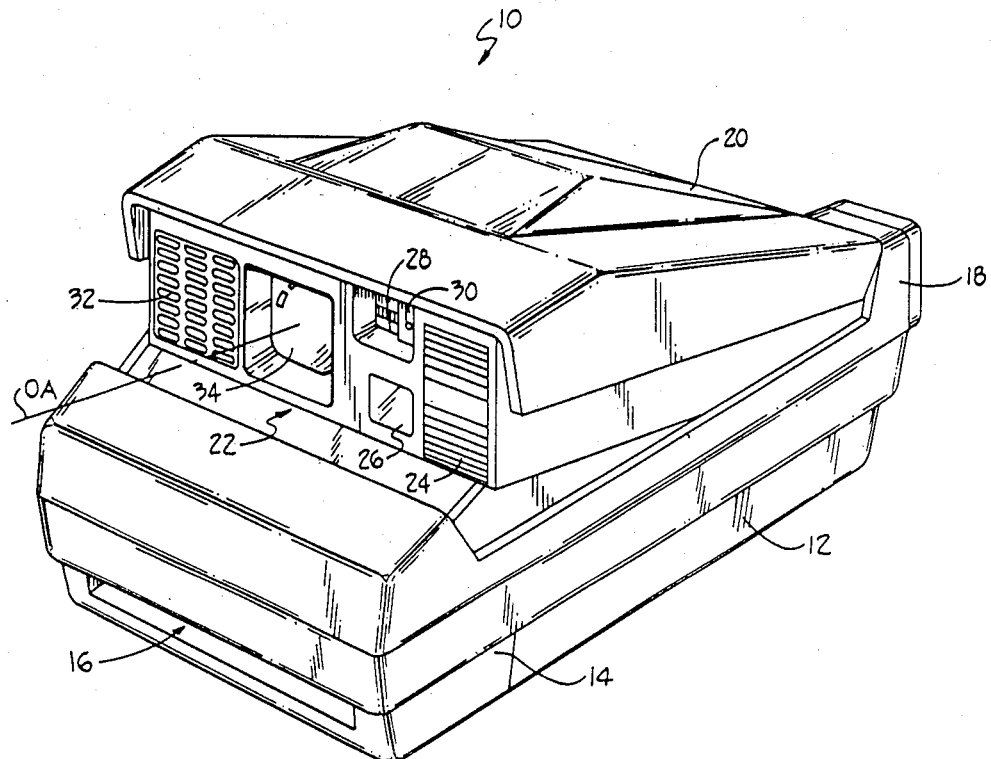
FIG. 1 is a perspective view of a folding type camera which incorporates a preferred embodiment of the instant invention, the camera being shown in its erected operative condition.

Reference is now made to the drawings, and in particular to FIG. 1 wherein is shown a camera 10 of the folding type. The camera 10, which is substantially similar to the Polaroid Spectra camera, includes a base section 12 for supporting a film cassette containing a stack of instant type film units in position for their sequential exposure. Extending forwardly of the base section 12, and pivotally coupled to its end, is a housing 14 having an egress 16 through which a film unit is adapted to be advanced, subsequent to its exposure, by a motor driven pair of spread rollers mounted within the housing 14. The housing 14 is adapted to be rotated in a counterclockwise, as viewed in FIG. 1, about its pivotal connection to the base 12 in order to expose an open end of the base 12 so that a film cassette may be inserted into or removed from the base 12.

The base 12 includes a pair (only one shown) of upwardly extending portions 18 at its rear end to which is pivotally coupled a housing 20 having a face plate 22 at its free end. The face plate 22 provides a support for a strobe 24, a view finder window 26, a photocell window 28, an LED 30 for use in a self-portrait photographic cycle, a sonar range finder 32 and an objective lens assembly 34 mounted in front of a pair of shutter blades (not shown) which are a part of the camera's automatic exposure system. The objective lens assembly 34 has an optical axis OA and is adapted to direct image bearing light rays onto a reflective surface of a mirror contained within the housing 20 which in turn redirects the rays through an angle of ninety degrees onto a film unit located within the base 12. For more details of the camera 10 and its automatic exposure system reference should be had to U.S. Pat. Nos. 4,444,478, 4,445,763, 4,508,440, and 4,542,967.

Figure 3:
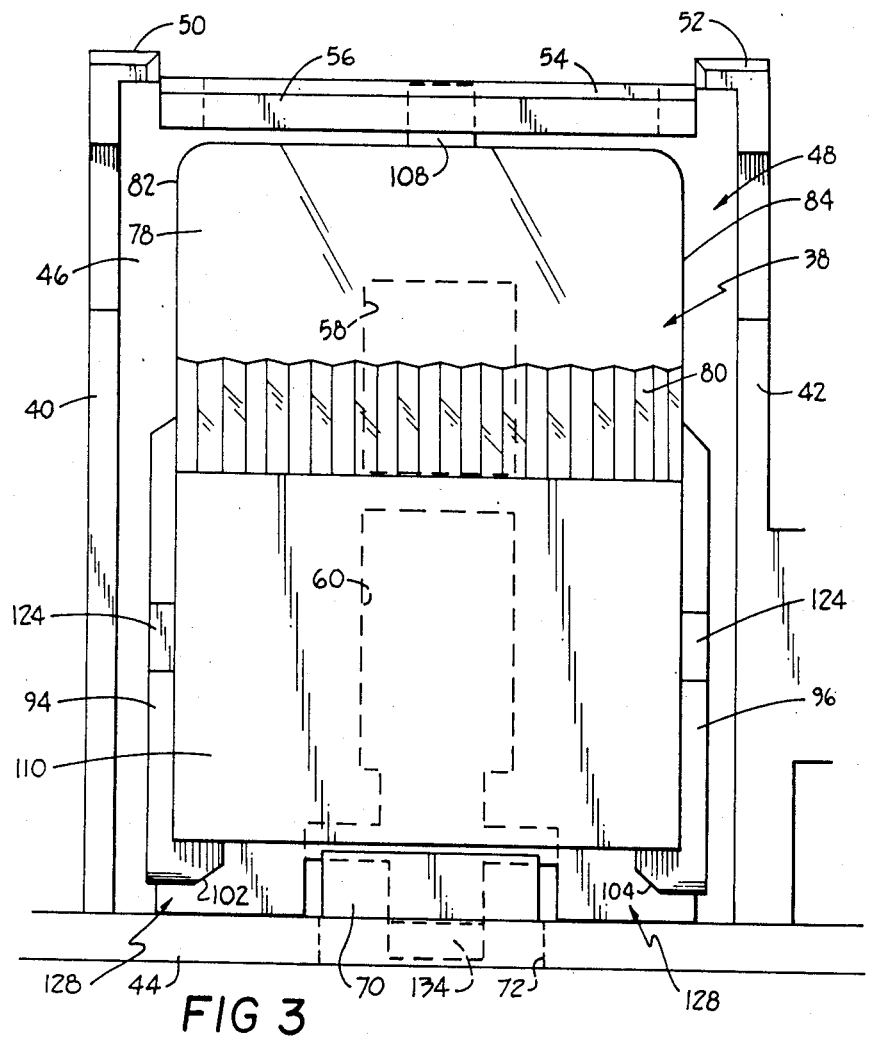
FIG. 3 is an enlarged front elevational view of the photocell lens assembly of FIG. 2 and its supporting structure.
Figure 4:
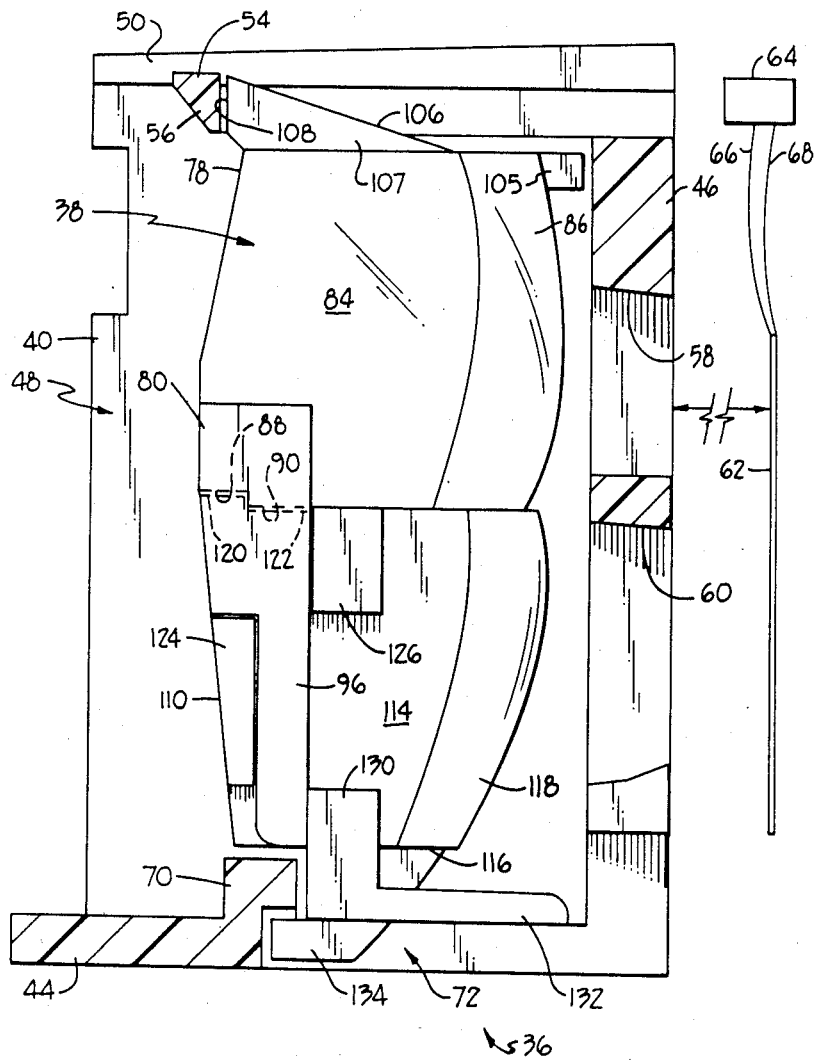
FIG. 4 is an enlarged side elevational view of the photocell assembly, its associated light sensitive element, and the supporting structure for the photocell lens assembly.

Located behind the face plate 22 is a lens board or support structure 36 for receiving and positioning a photocell lens assembly 38 in alignment with the photocell window 28. As best shown in FIGS. 3 and 4, the support structure 36 includes a pair of vertical side walls 40 and 42 whose lower ends are connected by a bottom wall 44 and whose rearwardly facing edges are interconnected by a rear wall 46, thus defining a chamber 48 having an open top and front (to the left as viewed in FIG. 4). The upper ends of the vertical side walls 40 and 42 have inwardly facing flanges 50 and 52, respectively, which are interconnected by a laterally extending beam 54 having a beveled forwardly facing surface 56. The rear wall 46 is apertured at 58 and 60 so as to provide for the passage of light from the photocell lens assembly 38 to the photosensitive surface of a light sensitive element 62, which in turn is connected to an exposure control circuit, schematically depicted at 64, by a pair of wires 66 and 68. The bottom wall 44 is provided with an upwardly extending flange 70. Also, the bottom wall 44 has a slot 72 therein which extends from the flange 70 to and through the rear wall 46.

Figure 2:
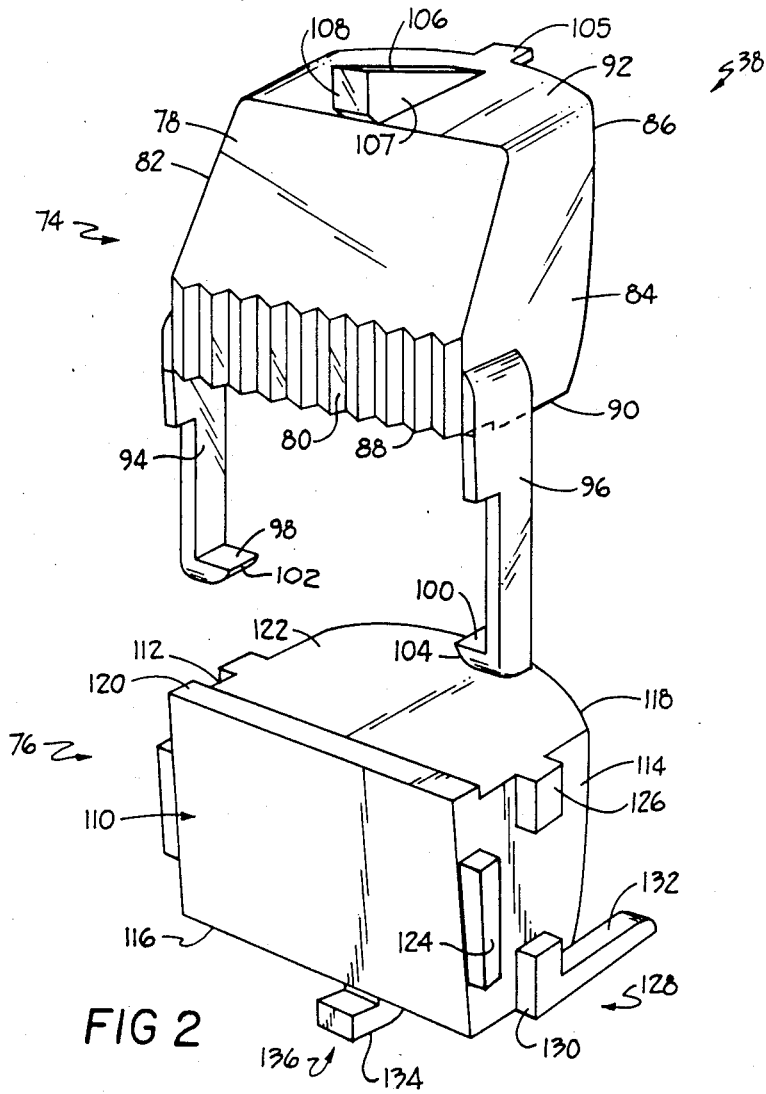
FIG. 2 is an exploded perspective view of a photocell lens assembly.

As best seen in FIG. 2, the photocell lens assembly 38 includes first and second molded lens portions 74 and 76, respectively. The first lens portion 74 is constructed to transmit visible spectral energy to the exclusion of infrared spectral energy whereas the second lens portion 76 is constructed to transmit IR frequency spectral energy only.

The first photocell lens portion 74 includes a generally planar polished surface 78 and a polished sawtooth surface 80, both of which face the scene to be photographed, a pair of side surfaces 82 and 84, a double convex rear surface 86, a bottom surface comprised of flats 88 and 90 which are located in generally parallel planes, and an upper surface 92. A pair of laterally spaced resilient arms 94 and 96 are integrally formed with the side surfaces 82 and 84, respectively, and extend downwardly therefrom to a point where they terminate in inwardly turned flanges 98 and 100 having beveled surfaces 102 and 104. Extending rearwardly from rear surface 86 is a spacer 105, while a protrusion 107 having an upwardly inclined surface 106 and a generally vertical surface 108 rises from an intermediate portion of the top surface 92.

The second photocell lens portion 76 has a surface 110 which faces the scene to be photographed, a pair of side surfaces 112 and 114, a bottom surface 116, a double convex rear surface 118 and an upper surface comprised of flats 120 and 122 which are generally coextensive in area with the flats 88 and 90 of the first photocell lens element 74. Integrally formed in each side surface 112 and 114 is a first pair of lugs 124 and a second pair of lugs 126 (only one lug being shown). Also integrally formed with each side surface 112 and 114 is an L-shaped support member 128 having a generally vertical section 130 and a longitudinally extending horizontal section 132. The longitudinal spacing between each of the lugs 124 an the lugs 126 and vertical portions 130 is of a distance substantially equal to the thinnest portion of each of the arms 94 and 96 so as to firmly grasp the latter as best shown in FIG. 4.

The first and second photocell lens portions 74 and 76 are assembled by aligning them as shown in FIG. 2 and by pushing them toward each other until the lateral edges of the flat 122 engage the beveled surfaces 102 and 104 thus causing the arms 94 and 96 to be flexed outwardly. The arms 94 and 96 are then guided between the lugs 124 and 126 and the vertical portions 130 of the L-shaped members 128 until the flanges 98 and 100 pass below the bottom surface 116, at which point their respective arms 94 and 96 spring back into their unstressed positions thus locking the two lens portions 74 and 76 to each other with the flats 88 and 90 in firm engagement with the flats 120 and 122. The photocell lens assembly 38 may now be inserted into its supporting structure by positioning the lower end of the assembly 38 between the vertical walls 40 and 42; then, passing the horizontal portion 134 of an L-shaped member 136, extending downwardly from the bottom surface 116, through the slot 72 and beneath the flange 70 of the supporting structure. Now, the photocell lens assembly 38 is pivoted in a clockwise direction, as viewed in FIG. 4, thus causing the inclined surface 106 to cam the beam 54 upwardly until the photocell lens assembly 38 snaps into place and the beam 54 returns to its horizontal position, as shown in FIG. 4. Thus located, there is no fixed connection between the photocell lens assembly 38 and its supporting structure. Movement of the photocell lens assembly 38, about the camera's pitch axis, relative to its supporting structure is substantially zero because of the adjacency of the spacer 105 to the rear wall 46, and the vertical surface 108 of the protrusion 107 to the beam 54. However, the photocell lens assembly 38 is free to rotate through an angle of approximately five degrees, in either direction relative to its supporting structure and the light sensitive element 62 as the camera 10 is rotated about its roll axis. In this regard, the members 128 provide a stabilizing means for preventing any such relative angular movement of the photocell lens assembly 38 during initial rotation of the camera 10 about its roll axis. In fact, relative angular movement of the photocell lens assembly 38 does not take place until the camera 10 has been rotated approximately forty-five degrees about its optical or roll axis.

Figure 6:
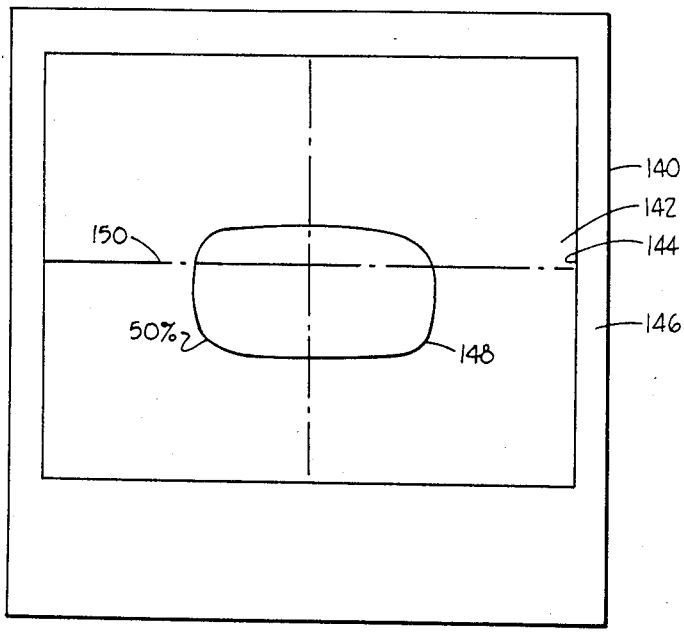
FIG. 6 is a plan view of a film unit of the rectangular format showing a responsive curve for the camera of FIG. 1 when located in a horizontally orientated picture taking attitude, such attitude being shown in FIG. 1.
Figure 7:
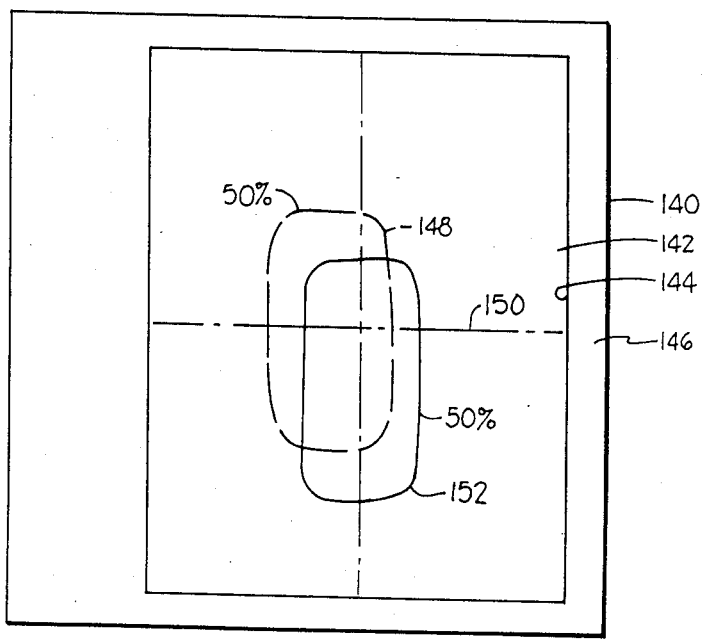
FIG. 7 is a view similar to FIG. 6 with the film unit being rotated ninety degrees in a counterclockwise direction due to the camera being located in a vertically orientated attitude.

Reference is now made to FIGS. 6 and 7 wherein is shown a film unit 140 of the self-developing or instant type having an image area 142 defined by a rectangular opening 144 in a mask 146, which film unit 140 is adapted for use with the camera 10. FIG. 6 shows a closed curve 148 which represents connected points in a region of a scene from which the light sensitive element 62 received radiation (50% response), such curve 148 being superposed upon the image area 142 of the film unit 140 with the line 150 representing the horizon. It can readily be seen that a majority of the area enclosed by the curve 148 is below the horizon, i.e., that the majority of the enclosed scene represents the foreground rather than the background (which often includes the sky).

Figure 5:
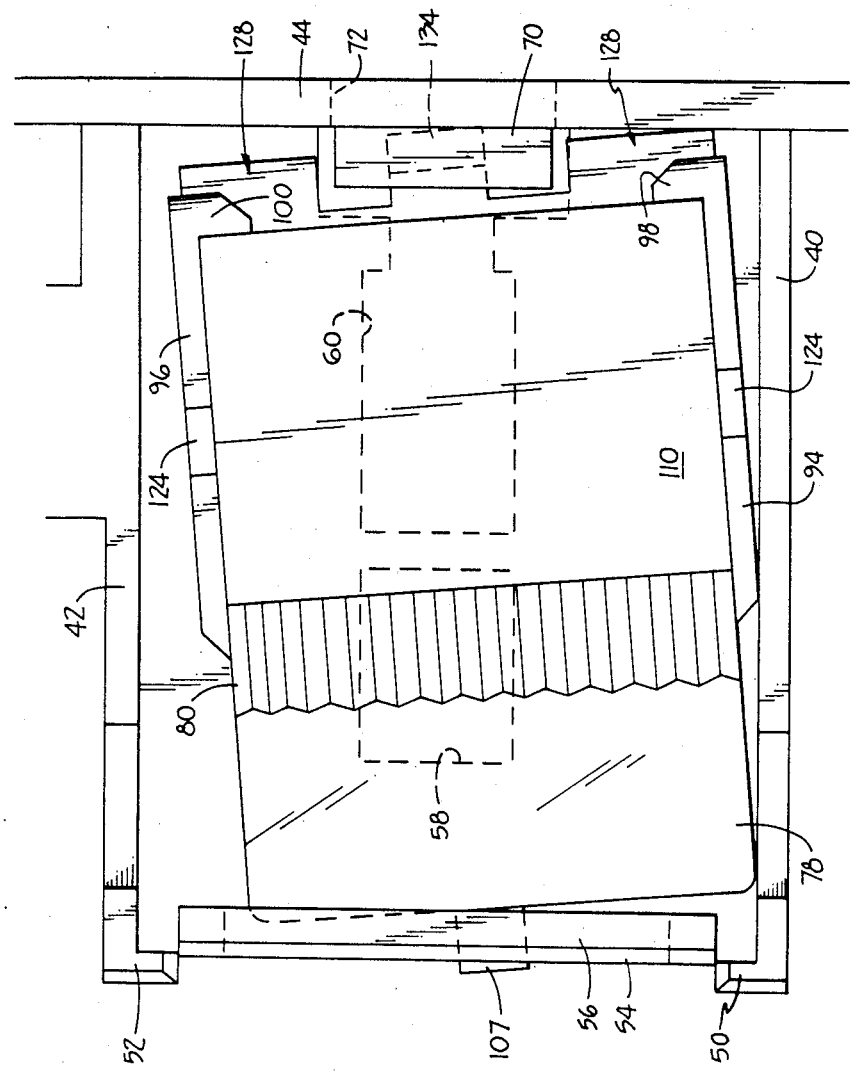
FIG. 5 is an enlarged front elevational view of the photocell lens assembly and its supporting structure, rotated ninety degrees in a counterclockwise direction from the position depicted in FIG. 3.

FIG. 7 depicts the same curve 148 as it would appear superposed upon the image area 142 of the film unit 140, if (1) the camera 10 and thus the film unit 140 were rotated ninety degrees, i.e., the camera is in a vertically orientated picture taking attitude, vis-a-vis, the horizontally orientated picture taking attitude depicted in FIG. 6, and (2) the photocell lens assembly 38 were fixed against rotational movement relative to the light sensitive element 62. In FIG. 7, it can be seen that the same area enclosed by the curve 148 contains more of the background and thus the light sensitive element 62 will "read" more light than in the position depicted in FIG. 6 and the film unit 140 will be underexposed, unless the response by the light sensitive element 62 is adjust. Such adjustment is accomplished by permitting the photocell lens assembly 38 to rotate through an angle of approximately five degrees relative to the light sensitive element 62 as the camera 10 is rotated between the horizontal and vertical picture taking attitudes. In other words, if the camera 10 is rotated ninety degrees about its optical axis AO, the photocell lens assembly 38 rotates the same ninety degrees, plus an additional five degrees, thus altering the light incident upon the light sensitive element 62. This position is depicted in FIG. 5. The fifty percent response curve is now indicated by the solid line 152 which encloses an area which contains less of the background and more of the foreground than the area enclosed by the broken line 148 in FIG. 7, thus providing the needed adjustment.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:

1. A photographic camera comprising:
   an objective lens for directing image-bearing light toward a focal plane, said objective lens having an optical axis;
   a photocell unit for varying the exposure of a film unit in accordance with the intensity of scene light measured thereby, said photocell unit including a light sensitive element and a photocell lens assembly for directing scene light onto said light sensitive element; and
   means for supporting said photocell lens assembly for angular movement relative to said light sensitive element between first and second positions, as said photographic camera is rotated substantially ninety degrees about an axis parallel or coincident with said optical axis, from a substantially horizontally orientated picture taking attitude to a substantially vertically orientated picture taking attitude, said relative angular movement being in addition to said ninety degree rotation of said photographic camera.

2. A photographic camera as defined in claim 1 wherein said supporting means is constructed to allow said relative angular movement of said photocell lens assembly in a plane perpendicular to said optical axis.

3. A photographic camera comprising:
   an objective lens for directing image-bearing light toward a focal plane, said objective lens having an optical axis;
   a photocell unit for varying the exposure of a film unit in accordance with the intensity of scene light measured thereby, said photocell unit including a light sensitive element and a photocell lens assembly for directing scene light onto said light sensitive element; and
   means for supporting said photocell lens assembly for angular movement relative to said light sensitive element and in a plane perpendicular to said optical axis between first and second positions, as said photographic camera is rotated substantially ninety degrees about an axis parallel or coincident with said optical axis, from a substantially horizontally orientated picture taking attitude to a substantially vertically orientated picture taking attitude, said relative angular movement being approximately five degrees and in addition to said ninety degress rotation of said photographic camera.

4. A photographic camera as defined in claim 3 wherein said photocell lens assembly includes a pair of laterally spaced support members for stabilizing said photocell lens assembly against said relative angular movement during initial rotation of said photographic camera out of said horizontally orientated picture taking attitude.

* * * * *